July 10, 1928.
P. W. PALM
1,676,705
TREAD ATTACHMENT FOR VEHICLE WHEELS
Filed Feb. 23, 1927   2 Sheets-Sheet 1
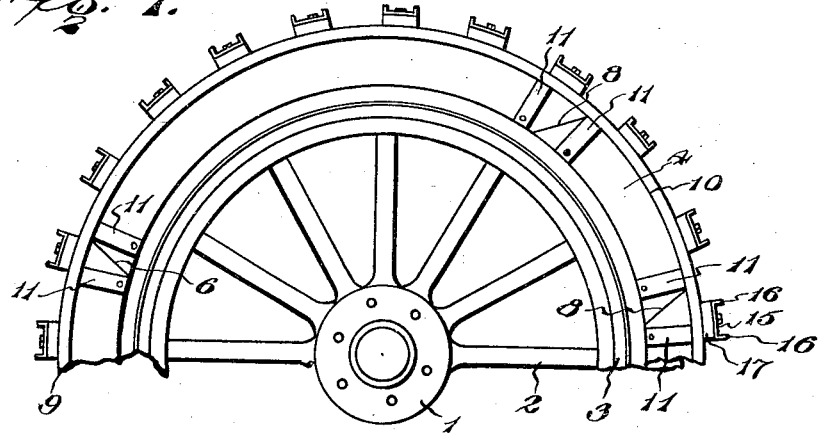
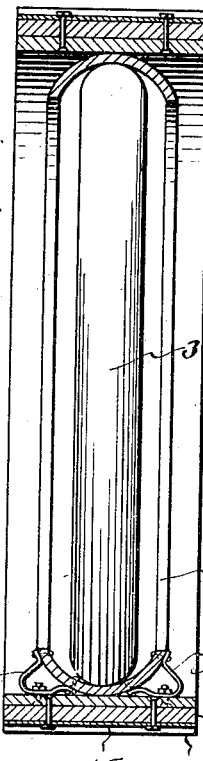
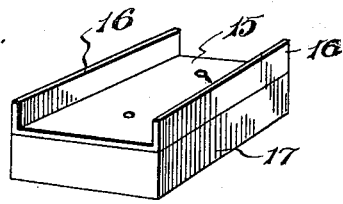
Inventor
P. W. Palm
By Lacey & Lacey, Attorneys

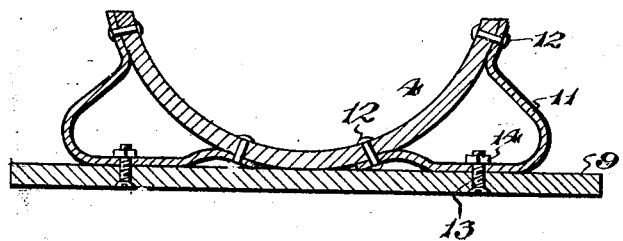
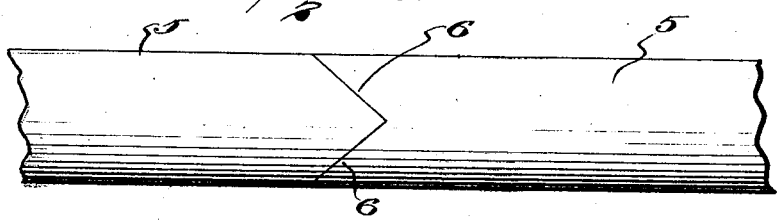
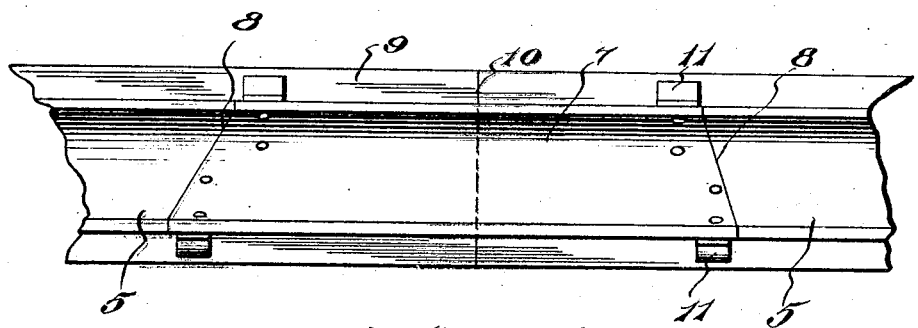

Patented July 10, 1928.

1,676,705

UNITED STATES PATENT OFFICE.

PER WILHELM PALM, OF BAUDETTE, MINNESOTA.

TREAD ATTACHMENT FOR VEHICLE WHEELS.

Application filed February 23, 1927. Serial No. 170,372.

This invention seeks to provide an efficient, durable and easily applied device whereby the wheels of vehicles will be prevented from sinking in soft or muddy ground and obtain sufficient traction to propel the vehicle. The invention seeks to provide a device which will fit about the tire of a wheel and provide a tread surface extending laterally beyond the tire so as to obtain a broad contact with a soft surface and thereby support the vehicle upon such surface and resist the tendency of the wheels to sink into the same. Other objects of the invention will appear incidentally in the course of the following description, and the invention resides in certain novel features which will be particularly pointed out in the appended claim.

In the accompanying drawings:

Figure 1 is a side elevation of a portion of a wheel having my improved tread attachment applied thereto;

Fig. 2 is a transverse section;

Fig. 3 is an enlarged detail transverse section of the attachment;

Fig. 4 is an outside view of a portion of the inner member of the attachment;

Fig. 5 is an inside view of a portion of the attachment, and

Fig. 6 is a detail perspective view of a cleat or mud shoe which may be employed.

In the drawings, the reference numeral 1 indicates the hub, 2 the spokes, and 3 the tire of an ordinary vehicle wheel, it being understood that the tire may be a pneumatic tire or any other preferred form of tire.

In carrying out my invention, I employ a circular band 4 which is arcuate in cross section, as shown clearly in Figs. 2 and 3, and this band is made in a plurality of sections to facilitate its application to the wheel. Some of the sections, indicated at 5, are provided at their meeting ends with diagonally disposed intersecting cuts, indicated at 6, whereby a pointed tongue is formed on one section to enter a corresponding recess or notch in the meeting end of the adjacent section, this construction maintaining the sections in alinement after they have been applied to the wheel. One section 7 has its end edges formed on oblique lines which converge toward one side edge, as shown at 8 in Fig. 5, so that this section may be inserted sidewise between the other sections after the attachment has been partly assembled upon the vehicle wheel, the meeting ends of the adjacent sections being correspondingly formed, as will be understood. I also provide an outer circular band or shoe 9 which is flat in cross section and has its ends cut to form a butt joint extending at a right angle to its side edges, as indicated at 10 in Fig. 5. This outer band or shoe is intended to encircle the inner band 4 and should be of sufficient width to provide an adequate supporting surface for the vehicle wheel. The section 7 of the inner band is intended to bridge the butt joint 10 so that the possibility of mud, sand or other soft earthy material seeping into the space between the outer shoe and the inner band and detracting from the efficiency of the device will be minimized. In order to maintain the inner band and the outer shoe in fixed relation, I provide a plurality of brackets 11 which may be constructed of flat bar material which is bent into substantially V-shape in edge view, as shown in Fig. 3. The ends of the brackets are secured to the inner band by rivets or bolts 12 inserted therethrough, and the intermediate portions of the brackets are secured to the outer shoe by bolts 13 inserted inwardly through the shoe and the bracket and countersunk in the outer surface of the shoe, being retained in position by nuts 14 fitted upon their inner ends and turned home against the inner surfaces of the respective brackets. These brackets will be provided in any desired number and preferably there will be one bracket at each end of each section of the inner band, the brackets being duplicated, of course, upon the two sides of the band. These brackets not only maintain the shoe and the band in fixed relation but also reinforce both members so that collapse under stress is not apt to occur.

The device will operate efficiently with the outer surface of the shoe 9 in contact with the surface over which the vehicle is traveling, particularly if said surface be of a soft nature. When traveling upon a frozen surface, it is desirable to employ cleats, such as shown in Fig. 6, which consist of channeled metallic members 15 having side flanges 16 projecting from their edges, and these cleats may be secured directly to the shoe 9, as will be understood. I prefer, however, to interpose a wooden block 17 between each cleat and the shoe so that the cleats will be more effectually set off from the shoe and avoid wearing contact between the shoe and the ice or other hard surface. These cleats may be disposed diagonally or straight across the shoe as may be preferred.

The inner band is first assembled upon the wheel by placing the sections thereof in proper position about the tire and the outer shoe may then be slid sidewise over the assembled inner band, the bolts 13 being then inserted and the nuts 14 mounted thereon and turned home so as to secure the parts firmly in place. The sectional construction of the device permits it to be stored in a small space and also facilitates its application to or removal from a wheel, while in use it is found to be highly efficient for the purposes for which it is designed.

Having thus described the invention, I claim:

A tread attachment for vehicle wheels comprising an inner band composed of a plurality of sections arranged end to end and each of arcuate cross section whereby to encircle a tire upon a wheel, an outer shoe flat in cross section adapted to encircle the said band, and means for securing the shoe and the band in fixed relation about a wheel and the tire thereon.

In testimony where I affix my signature.

PER WILHELM PALM. [L. S.]